United States Patent
Holub et al.

(10) Patent No.: US 11,956,255 B1
(45) Date of Patent: Apr. 9, 2024

(54) RECOGNIZING SUCCESSFUL CYBERATTACKS BASED ON SUBSEQUENT BENIGN ACTIVITIES OF AN ATTACKER

(71) Applicant: Rapid7, Inc., Boston, MA (US)

(72) Inventors: Viliam Holub, Prague (CZ); Trevor Parsons, Boston, MA (US); Eoin Shanley, Dublin (IE)

(73) Assignee: Rapid7, Inc., Boston, MA (US)

( * ) Notice: Subject to any disclaimer, the term of this patent is extended or adjusted under 35 U.S.C. 154(b) by 464 days.

(21) Appl. No.: 17/363,775

(22) Filed: Jun. 30, 2021

(51) Int. Cl.
| | |
|---|---|
| *H04L 29/06* | (2006.01) |
| *G06F 18/214* | (2023.01) |
| *G06N 20/00* | (2019.01) |
| *H04L 9/40* | (2022.01) |
| *H04L 41/22* | (2022.01) |

(52) U.S. Cl.
CPC ........ *H04L 63/1416* (2013.01); *G06F 18/214* (2023.01); *G06N 20/00* (2019.01); *H04L 41/22* (2013.01); *H04L 63/1425* (2013.01); *H04L 63/1466* (2013.01)

(58) Field of Classification Search
CPC ............. H04L 63/1416; H04L 63/1425; H04L 63/1466; H04L 41/22; G06N 20/00; G06F 18/214
See application file for complete search history.

(56) References Cited

U.S. PATENT DOCUMENTS

| | | | |
|---|---|---|---|
| 11,611,590 B1 * | 3/2023 | Amar | G06N 20/00 |
| 2020/0059481 A1 * | 2/2020 | Sekar | H04L 63/1425 |

* cited by examiner

*Primary Examiner* — Jeffrey C Pwu
*Assistant Examiner* — Thong P Truong
(74) *Attorney, Agent, or Firm* — Ashwin Anand

(57) ABSTRACT

Embodiments of a cyberattack monitoring system are disclosed to identify successful attacks on a service based on benign activities of the attacker performed after the initial attack attempt. In embodiments, the system identifies the initial attack by matching client actions to known attack patterns. Clients observed with attempted attacks are remembered as suspected attackers. The system will then monitor subsequent actions of suspected attackers for signs that the initial attack attempt was successful. In embodiments, a successful attack is recognized when the system observes one or more subsequent benign actions by the suspected attacker. In embodiments, the presence of follow-on benign actions is used as a filter to filter out unsuccessful attacks and false positives detected by the system. The filtering enables the system to better focus system resources and human attention on a small set of client activities that are likely successful attacks.

19 Claims, 9 Drawing Sheets

Suspected Successful Attacks 500

| Attacker ID 510 | Matched Attack Pattern 512 | Time of Attack Attempt 514 | Time of Follow-on Activities 516 | Follow-on Activity Severity Score 518 |
|---|---|---|---|---|
| 13.238.122.48 | File download using root path escape | 2021-06-01 22:42:59 | 2021-06-01 23:02:10 to 2021-06-01 23:15:45 | 92 |
| 172.41.44.* | Attempts to download non-existent configuration files or scripts | 2021-06-02 18:40:30 | 2021-06-02 20:19:49 to 2021-06-02 22:41:24 | 86 |
| 122.27.59.201 | Code injection - SQL | 2021-06-05 14:27:05 | 2021-06-05 14:29:20 to 2021-06-05 14:33:45 | 85 |
| 64.39.109.99 | Code injection - PHP | 2021-06-06 02:15:20 | 2021-06-06 02:30:32 to 2021-06-06 03:20:42 | 75 |

Review Attack Details 520

- Attack Attempt Log Entries 522
- Follow-on Activity Log Entries 524
- Attacker Details in Attacker Database 526
- Attacker Activities on Other Systems 528

Attack Mitigation Measures 530

- Block Further Attacker Actions 532
- Roll Back Attacker Actions 534
- Track Attacker Actions 536
- Add Comments About the Attack 528

*FIG. 5*

RECOGNIZING SUCCESSFUL CYBERATTACKS BASED ON SUBSEQUENT BENIGN ACTIVITIES OF AN ATTACKER

BACKGROUND

Popular websites or web-based services experience large numbers of cyberattacks on a regular basis. Attackers will often programmatically perform the same attack on many websites to look for a few that are exploitable by the attack. The vast majority of these attack attempts fail and do not warrant any response. Modern threat detection systems are programmed to detect these attacks by matching anomalous, illegal, or dangerous client activities to "negative" attack patterns. However, these negative patterns typically capture too many instances of suspicious behavior, including failed attack attempts and false positives caused by innocent client errors. The large volume of suspicious activities captured by these systems can be overwhelming to security analysts monitoring the websites and cause the analysts to miss truly serious attacks. Although more discriminating attack detection algorithms do exist, they are usually slow and resource-intensive, making them impractical for monitoring routine client activities. There is a need in the field for more practical solutions to filter through large amounts of suspicious client activities to identify truly significant attacks.

SUMMARY OF EMBODIMENTS

The systems and methods described herein may be employed in various combinations and embodiments to implement a cyberattack monitoring system configured to identify successful attacks based on benign activities of the attacker performed after an initial attack attempt by the attacker. In some embodiments, the system identifies initial attack attempts by matching observed client actions (e.g. client requests to a web server) against known attack patterns. Clients observed with attack actions are remembered as suspected attackers (e.g. in an attacker database). Once an attacker is identified, embodiments of the system will monitor subsequent activities of the attacker for signs that the initial attack attempt was successful. In some embodiments, a successful attack is recognized when the suspected attacker performs one or more subsequent benign actions on the service that do not match any of the known attack patterns. Attackers typically cease interactions with a targeted service once the initial attack attempt fails, and so observations of follow-on actions from an attacker are an indication that the initial attack was successful. In some embodiments, the disclosed system uses observations of benign follow-on activities as a filter to screen detected attacks for reporting and mitigation response purposes. Advantageously, the filtering allows the system to better focus system resources and human attention on those client activities that are likely successful attacks while ignoring other activities that represent unsuccessful attacks or false positives.

BRIEF DESCRIPTION OF THE DRAWINGS

FIG. 5 illustrates a graphical user interface that allows a user to review and take mitigation actions on successful attacks on a service detected by a cyberattack monitoring system, according to some embodiments.

Figure 1:
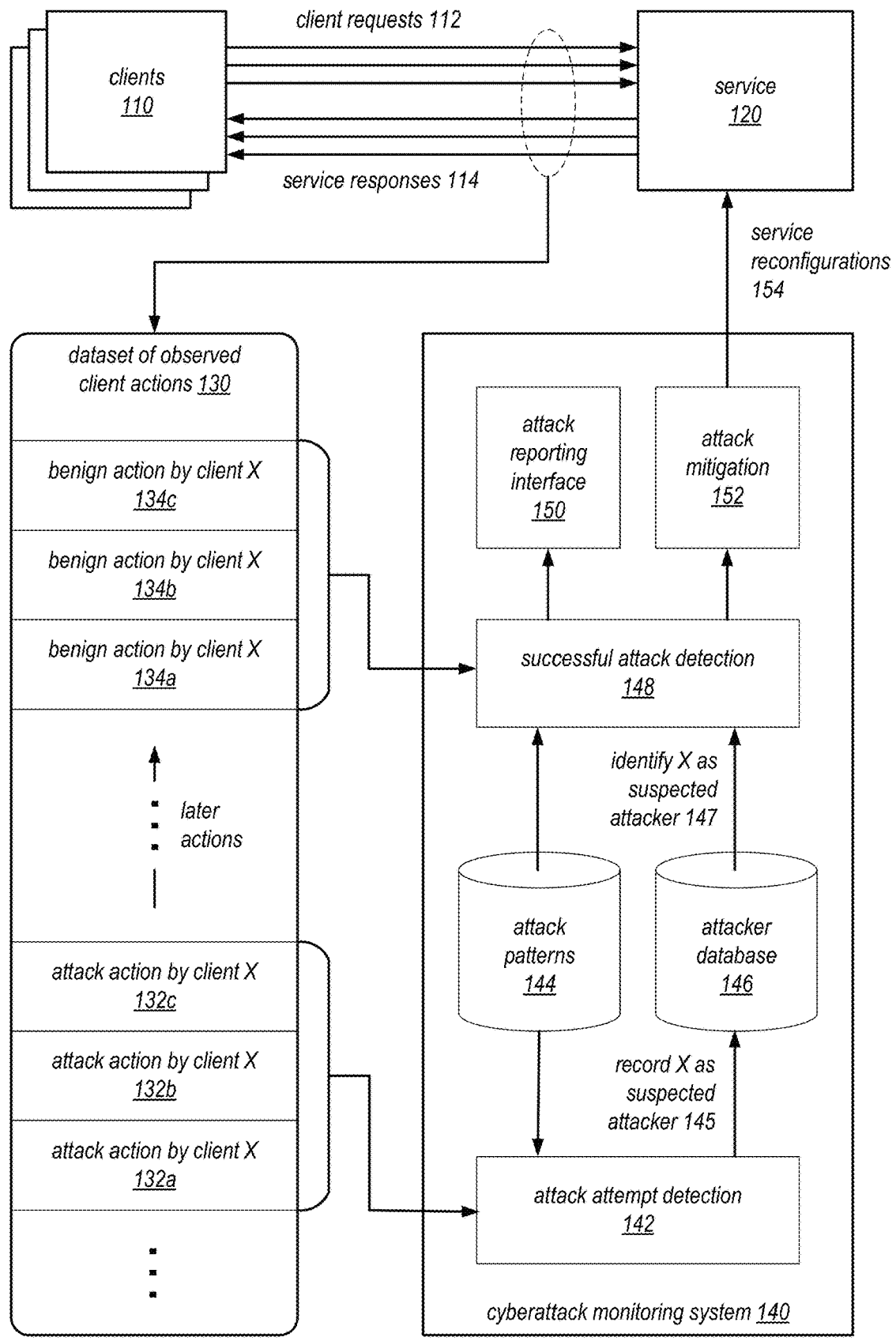
FIG. 1 is a block diagram illustrating components of a cyberattack monitoring system that detects successful attacks based on subsequent benign actions of an attacker following an initial attack, according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Modern threat detection systems are programmed to recognize cyberattacks by detecting "negative" behavior patterns of clients (e.g. anomalous, wrong, or dangerous behaviors). However, these systems tend to produce too many detections, because they will detect unimportant events such as unsuccessful attack attempts and innocent client errors. The large volume of threats reported by these systems makes it difficult for security analysts to identify real threats. In many cases, security analysts will simply ignore the threats reported by these systems as a whole.

To address such problems in current threat detection systems, this disclosure describes embodiments of a cyberattack monitoring system capable of identifying cyberattacks against web-based services that are likely successful attacks. In addition to detecting the "negative" behavior of clients, the disclosed monitoring system will also monitor for "non-negative" or benign patterns of a suspected attacker after an observed attack attempt. Examples of a benign client activity may include accessing an API without an error message, downloading a file, a successful login, etc. The monitoring system will analyze such follow-on benign activities to retrospectively determine the significance of the previously observed attack attempt.

The disclosed approach is highly effective in identifying successful cyberattacks on large websites, where an attacker commonly leaves the website if the initial attack attempt was unsuccessful. When the attacker performs further activities on the website after the initial attack, even if the activities are benign actions that do not match known attack patterns, it is an indication that the initial attack was successful. For example, repeated access to a restricted part of a website following an initial attack attempt suggests that the attacker has successfully breached the website. These follow-on activities of the attacker, while not easily detectable using simple pattern matching, can provide important clues regarding the severity and progress of the attack. In some embodiments, the disclosed monitoring system may use observed follow-on activities of suspected attackers as a filter to filter through attack attempts observed based on simple pattern matching. The filtering will produce a smaller set of more significant attacks (e.g. attacks that were likely successful), which can be more closely analyzed or monitored.

In some embodiments, the monitoring system may be configured to receive and analyze a flow of log entries (e.g. entries in a web server log). The system may apply an evaluation function to detect attack patterns in the log and determine (e.g. based on a threshold) particular client actions that correspond to an attempted attack. The actors associated with the attempted attacks are recorded as suspected attackers (e.g. in an attacker database). The monitoring system may then continue to scan the log to look for additional benign activities by the suspected attacker after the attempted attack. The benign activities are analyzed based on configurable evaluation criteria to determine whether the attempted attack was successful. In some embodiments, observation of any follow-on benign activity by the suspected attacker can indicate a successful attack. In some embodiments, a successful attack is recognized if a ratio of subsequent attack actions to benign actions by the attacker exceeds a specified threshold. In some embodiments, the subsequent activities of a suspect attacker may be analyzed using a machine learning model trained to recognize successful attacks.

In some embodiments, if the follow-on activities of the attacker does indicate a successful attack, the monitoring system may be configured to present (e.g. via a graphical user interface) evidence of the successful attack for human review. In some embodiments, the monitoring system may be configured to perform real-time monitoring of a web-based service and issue alerts about successful attacks or initiate automatic mitigation processes in response to detection of successful attacks.

The disclosed cyberattack monitoring system provides numerous technical advantages to improve the functioning of current threat detection systems. In one respect, the disclosed monitoring system is able to effectively filter through large amounts of attack attempts made against a web-based service to determine a smaller set of likely successful attacks. The smaller set of attacks can be presented to security analysts to better focus their attention and investigational efforts. Moreover, the smaller set of attacks can be used to trigger more sophisticated monitoring or mitigation responses, including measures that are too resource-intensive or disruptive to be used against routine threat detections. In some embodiments, successful attack detection may be implemented using a purely forward-scanning technique, so that detections can be made in real-time or near real-time without revisiting past observation data. In some embodiments, multiple attack monitoring systems may be configured to work together (e.g. to monitor several related services) by allowing the multiple systems to share information via a common attacker database. Accordingly, an attempted attack by an attacker on one service can trigger appropriate security responses in the other services. These and other benefits and features of the disclosed cyberattack monitoring system are discussed in further detail below, in connection with the figures.

FIG. 1 is a block diagram illustrating components of a cyberattack monitoring system that detects successful attacks based on subsequent benign actions of an attacker following an initial attack, according to some embodiments.

The figure depicts a service 120 that receives client requests 112 issued by clients 110 and provides server responses 114 in response. In some embodiments, the service 120 may be a web-based service, such as a website or web application that is accessed over a network such as the Internet. The requests 112 and responses 114 may be web requests and responses specified in the HTTP protocol or a service API defined on top of the HTTP protocol. In some embodiments, the service 120 may allow remote users to log on to hosts operated by the service and execute various commands on the hosts. In some embodiments, the service 120 may be a cloud-based platform-as-a-service service that provides different types of computing resources to clients 110.

As shown, in some embodiments, the requests 112 and/or responses 114 between the clients and the service are captured in a dataset 130. The datasets 130 may be captured as log files that record actions of the clients on the service. For example, one type of dataset 130 may be a web server log that captures the HTTP requests and responses between a web server and its clients. Each log entry may indicate metadata such as a log sequence number, a timestamp, a client identifier, etc. In some embodiments, the dataset 130 may be an activity log that captures user actions (e.g. user commands) submitted to the service 120. In some embodiments, the dataset 130 may record additional metadata such as the service's execution and data state, among other types of information.

As shown, the dataset 130 is analyzed by the cyberattack monitoring system 140. In some embodiments, the cyberattack monitoring system 140 may be configured to receive periodic uploads of datasets 130 (e.g. web server logs) from many service operators, such as different data centers, organizations, companies, etc. The monitoring system may be configured to analyze these datasets for signs of possible successful attacks against the services and report these findings to security analysts for closer review. In some embodiments, the datasets 130 may be received as a continuous stream or flow of data from the service 120. For example, in some embodiments, the service 120 may be instrumented with reporting software that continuously reports data about the service's interaction with clients to the monitoring system 140. In some embodiments, the monitoring system 140 may be implemented as part of the service 120 itself.

As shown, the dataset 130 in this example captures client actions performed by different clients 110 on the service 120, including the actions of a particular client X. The dataset 130 may record client actions in sequential order as they occur. In this example, client X is observed to perform a series of attack actions 132a-c followed by a series of benign actions 134a-c. The cyberattack monitoring system 140 may implement an attack attempt detection component 142 capable of recognizing certain actions of the client as an attempted attack on the service 120. Signs of an attempted attack may include attempts to access inappropriate files such as password files that should not be open to the public. Another sign of an attempted attack may be a large number of requests trying variations on a file path or password. Yet another sign of an attempted attack may be code injection requests that exploit vulnerabilities on certain servers to illegally install or execute code on the server.

In some embodiments, a database of attack patterns 144 of known cyberattacks may be used by the monitoring system 140 to initially scan all client actions in the dataset 130. These attack patterns may be defined so that initial scanning can be performed relatively quickly (e.g. in real time). Depending on the embodiment, the attack patterns may be designed to look for client action patterns such as a number of unsuccessful logins, a number of accesses to nonexistent data, a request to access unauthorized data, an illegal API call, an API call with invalid call parameters, among others. In some embodiments, the contents of the attack patterns database 144 may be configurable and continuously evolve to include new types of attacks.

In some embodiments, the attack attempt detection component 142 may track an action sequence of a particular client in the dataset (e.g. one or more statistical measures of the action sequence), and apply an evaluation function to the action sequence to obtain an attack likelihood metric. If this attack likelihood metric exceeds a detection threshold, the action sequence will be recognized by the system as an attempted attack. In some embodiments, the attack attempt detection component 142 may implement a machine learning model that is trained to recognize different attack patterns in different action sequences. Such a machine learning model may generate an output (e.g. an attack classification and a confidence score), which is used as the basis for detection of an attack.

If a set of actions of a particular client (e.g. attack actions 132 by client X) is recognized as an attack attempt, embodiments of the monitoring system 140 will record 145 the client as a suspected attacker in an attacker database 146. For example, database 146 may be used to record the identity of the attacker client (e.g. a source IP address of the client, a user ID of the client, a session ID of the client, and the like). In some embodiments, the client identifier may be an identity tracking object associated with the client, such as a token, cookie, certificate, or key associated with the client. In some embodiments, the client identifier may be determined from application-specific metadata obtained from the client (e.g. metadata contained in HTTP header attributes from the client). In some embodiments, the client identifier may be the ID of a VPN connection used to connect to the service. In some embodiments, the attacker database may store additional details of each suspected attacker, including information about observed attacks of the attacker and the attacker's general behavior over time. In some embodiments, information in the database 146 may be persisted for long time, so that an attacker is effectively remembered forever. In some embodiments, the attacker database 146 may forget an attacker after some passage of time, so that the database is kept to a reasonable size. In some embodiments, the database 146 may be maintained in volatile memory, and reproduced on persistent storage for backup purposes.

As shown, in this example, the dataset 130 indicates that after the initial attack actions 132, client X later performs a sequence of benign actions 134a-c on the service 120. The benign action sequence 134 does not match any of the attack patterns 144 used by the monitoring system 140 to detect initial attack attempts. Examples of benign actions may include a successful login, a number of normal access to files on the service, a series of legal API calls without error, etc. In some embodiments, the benign action sequence 134 may include additional suspicious actions that may be seen as attack actions, but these suspicious actions do not rise to the level of an attempted attack.

In some embodiments, the monitoring system 140 may implement a successful attack detection component 148 to watch for these types of benign actions 134 of suspected attackers. For example, the component 148 may retrieve 147 the identities of suspected attackers from the attacker database 146 and maintain those identities in memory. When a benign action sequence is observed whose client identifier matches the client identifier of a previously suspected attacker (here client X), the successful attack detection module 148 will evaluate the benign actions 134 to determine if they indicate a successful attack by the attacker.

The criteria for recognizing a successful attack will be different depending on the embodiment. In some embodiments, these criteria may be configurable or evolve over time based on machine learning. In some embodiments, the monitoring system 140 may impose certain limits on when benign actions of an attacker qualify as a sign of successful attack. For example, in some embodiments, the benign action sequence 134 must occur within a specified time period after the initial attack attempt 132 (e.g. within a day or within the next three client sessions). In some embodiments, the benign action sequence must include a minimum number of actions or amount of data uploaded or downloaded.

In some embodiments, the successful attack detection component 148 may employ one or more statistical measures to determine if the benign action sequence indicates a successful attack. For example, embodiments of the component 148 may track statistics such as the number of actions in the sequence 134, the amount of data uploaded or downloaded by the sequence 134, or a ratio of attack actions to benign actions in the sequence 134 as factors in the determination. In some embodiments, these metrics may be tracked over time (e.g. recorded in the attacker database 146) and reevaluated using an evaluation function for each newly observed following action sequence from the attacker. For example, a successful attack may be detected when the overall attack-to-benign action ratio of the attacker exceeds a specified threshold.

In some embodiments, the successful attack detection component 148 may employ a machine learning model to analyze the benign action sequence 134. Because the follow-on actions of a suspected attacker are much less mechanical in nature, this type of detection is better suited for machine learning models, which are trained to recognize behavior patterns that are difficult to describe in terms of hardcoded patterns. In some embodiments, the above-described statistical measures may be used as input features to the machine learning model. In some embodiments, the machine learning model may be trained based on confirmed instances of follow-on activities of attackers. In some embodiments, the machine learning model may be trained to recognize anomalous behavior of the client based on the general behavior of all clients or clients that have been labeled as suspected attackers. Such a model may generate an anomaly metric that indicates the degree of strangeness of the client's behavior and recognize the attack as successful when the anomaly metric exceeds a threshold. In some embodiments, different models may be used to analyze the attacker's follow-on behavior depending on the nature of the initial attack attempt.

In some embodiments, if a successful attack is detected by the monitoring system 140, it may report the finding via an attack reporting interface 150. Accordingly, embodiments of the monitoring system 140 may be used to implement a cyberattack reporting system. In some embodiments, the attack reporting interface may be a broadcasting interface that broadcasts a detected successful attack over a communication system such as an email system, a messaging system, a social media platform, and the like. In some embodiments, the attack reporting interface may log its findings in a log or a database, such as the attacker database 146. In some embodiments, the attack reporting interface may be a graphical user interface (GUI) that allows security analysis to see instances of attacks on the service that are found to be possibly successful attacks. The GUI may provide a variety of information about the detected successful attack, including the client associated with the attack, the timing of the initial attack, information about the initial attack attempt, and information about the attacker's follow-on benign actions. The GUI may provide additional controls to allow the security analysis to more closely investigate the identified attacks and, if necessary, perform mitigation actions to mitigate furtherance of the attack. As discussed earlier, because of the additional filtering provided by the disclosed attack monitoring system 140, the system is able to present a much smaller set of truly significant attacks to the analysts, so that the analyst can more effectively focus his or her attention to addressing these threats.

In some embodiments, a detected successful attack will also trigger an attack mitigation component 152 to initiate mitigation actions for the attack. Accordingly, embodiments of the monitoring system 140 may be used to implement a cyberattack mitigation system. In some embodiments, the monitoring system 140 is able to detect successful attacks in real time or near real time, so that the mitigation actions can be initiated in time to stop furtherance of the attacks. Moreover, by using the additional filtering, the system is able to reduce threat detections to a small set of significant attacks against which automated mitigation actions can be automatically initiated.

The mitigation measures performed by the attack mitigation component 152 can vary depending on the embodiment and the configuration of the system. In some embodiments, the mitigation component 152 will automatically reconfigure 154 the service 120 to prevent or slow furtherance of the attack. In some embodiments, the service 120 may be reconfigured to block the attacker (e.g. client X) from performing further actions on the service (e.g. by denying further requests from client X). In some embodiments, the service may be reconfigured to reduce a rate at which the attacker's requests are performed by the service (e.g. increase a throttling rate for client X), while continuing to observe the behavior of the attacker. In some embodiments, the service may be reconfigured to roll back results of earlier actions performed by the attacker (e.g. undo data changes performed by the attacker's follow-on action sequence 134). In some embodiments, the service may be reconfigured to perform enhanced monitoring of the attacker (e.g. collect additional metadata about the attacker's further interactions with the service). In some embodiments, the service may be configured to route further requests of the attacker to a separate server specifically designated to handle requests from suspected attackers, so that activities of the attacker can be isolated and better monitored and controlled. In some embodiments, the service 120 may represent another service on the network, not necessarily the service monitored. In some embodiments, the service 120 is a network service, such as a firewall or load balancer.

Figure 2:
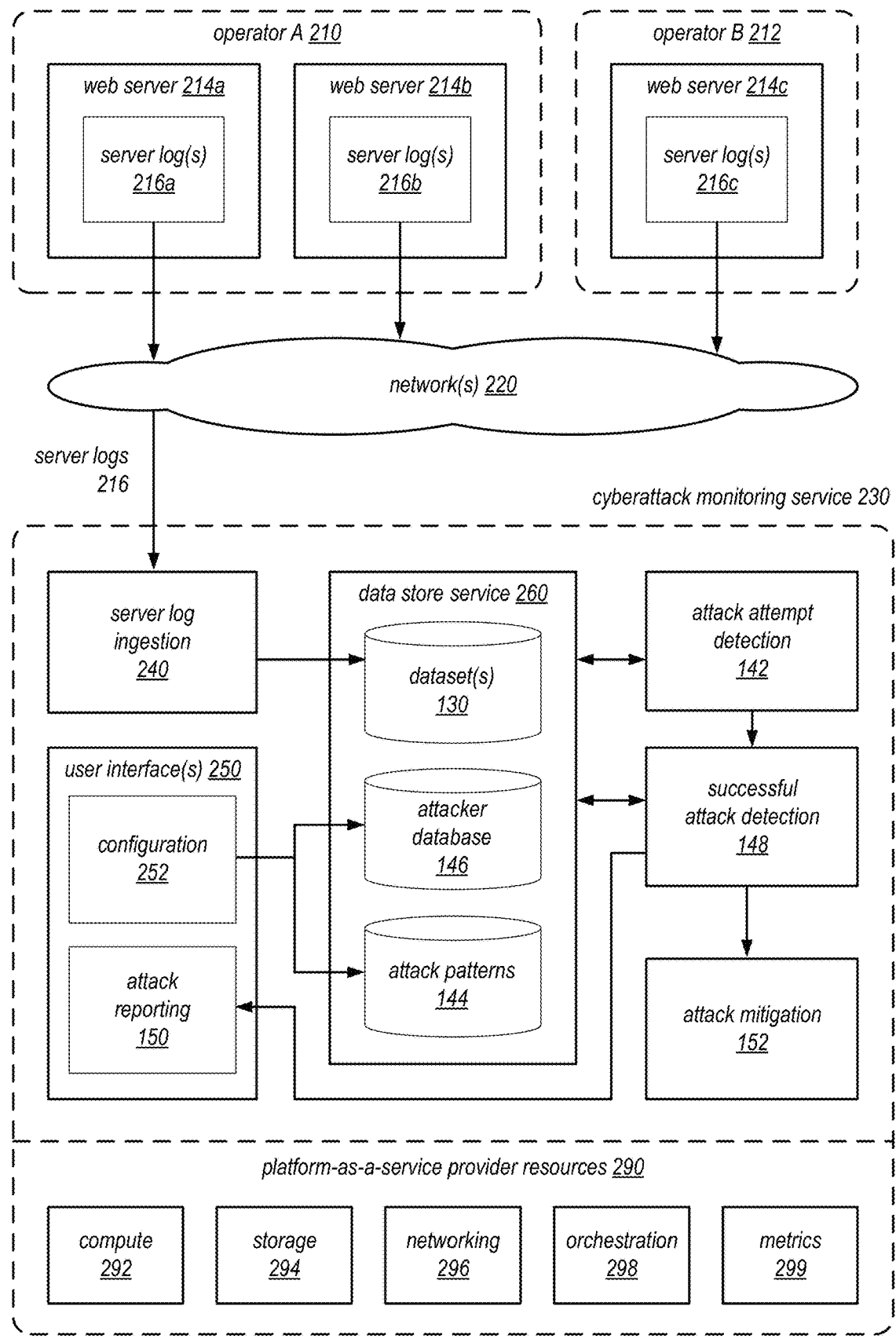
FIG. 2 illustrates a cloud-based implementation of a cyberattack monitoring system configured to detect successful attacks using web server logs, according to some embodiments.

FIG. 2 illustrates a cloud-based implementation of a cyberattack monitoring system configured to detect successful attacks using web server logs, according to some embodiments. The cyberattack monitoring service 230 depicted in the figure is an embodiment of the cyberattack monitoring system 140 of FIG. 1.

As shown, the cyberattack monitoring service 230 is a service implemented on a cloud-based platform-as-a-service (PaaS) provider network. The cyberattack monitoring service 230 is configured to receive, at a server log ingestion component 240 and via one or more networks 220, server logs 216*a-c* of web servers 214*a-c* operated by different operators 210 and 212. The cyberattack monitoring service 230 may be configured to monitor other types of services in other embodiments. In some embodiments, the server logs 216 may be uploaded to the monitoring service 230 periodically. In some embodiments, contents of the server logs may be streamed to the monitoring service in continuous data flows.

In various embodiments, the network(s) 220 may encompass any suitable combination of networking hardware and protocols necessary to enable communications between the agents 216 and the cyberattack monitoring service 230. In some embodiments, the web servers 214 may execute in a private network of a company, behind a company firewall, and the network 220 may include a public network such as the Internet, which lies outside the firewall. The network 220 may encompass the different telecommunications networks and service providers that collectively implement the Internet. In some embodiments, the network 220 may also include private networks such as private local area networks (LANs), private wide area networks (WANs), or private wireless networks. The network 220 may be implemented using different hardware (e.g., modems, routers, switches, load balancers, proxy servers, etc.) and software (e.g., protocol stacks, routing software, firewall/security software, etc.) for establishing networking links between the private networks of the web servers 214 and the cyberattack monitoring service 230. In some embodiments, the server logs 216 are transmitted over the network 220 using secure communication channels such as transport layer security (TLS) connections.

As shown, the cyberattack monitoring service 230 is implemented using a number of components implemented on the PaaS service provider network. The PaaS provider network may provide different types of computing resources 290, which can be leased by customers to implement custom hosted applications or services. As shown, the PaaS provider may provide resources such as compute resources 292, storage resources 294, networking resources 296, orchestration resources 298, and resource metrics monitoring 299. The components of the cyberattack monitoring service 230 may be built using these underlying resources provided by the PaaS provider. In some embodiments, the PaaS resources 290 may implement features such as load balancing of incoming service requests and/or dynamic management and scaling of service node pools. In some embodiments, components of the cyberattack monitoring service may be implemented using a pool of compute nodes provided by the PaaS provider, which may be individual instances of virtual machines. In some embodiments, the PaaS provider may be a provider such as AMAZON WEB SERVICES or MICROSOFT AZURE.

In some embodiments, the cyberattack monitoring service 230 is configured to monitor, analyze, and take action on cyberattacks detected on the web servers 216. As shown, once the server log data is received by the server log ingestion component 240, the data is stored as dataset(s) 130 in a data store service 260. In some embodiments, the datasets 130 may be stored as individual log files in a file system. Stored datasets 130 may be analyzed by detection components 142 and 148, as discussed in connection with FIG. 1. In some embodiments, the datasets 130 may be analyzed in a single forward scan using the two detection components 142 and 148. In some embodiments, the datasets 130 may be analyzed immediately as they are received, so that the cyberattack monitoring service 230 can provide real-time or near real-time alerts or responses for detected attacks. In some embodiments, the datasets 130 may be analyzed in a more delayed manner (e.g. on a daily or weekly basis) for reporting purposes or after-the-fact analysis. As shown, in some embodiments, the data store service 260 may be used to store other types of data used by the monitoring service, including the attacker database 146 and the attack patterns 144.

In some embodiments, when a successful attack is detected in a dataset 130, the monitoring service 230 may use the attack mitigation component 152 to mitigate the attack. In some embodiments, the mitigation component may simply report the detected attack to operators of the web server being attacked. In some embodiments, the attack mitigation component may take active steps to reconfigure the web server to prevent or slow furtherance of the attack, as discussed in connection with FIG. 1.

In some embodiments, detected attacks may be reported to an attack reporting interface 150, as discussed in connection with FIG. 1. In some embodiments, the monitoring service 230 may implement a set of user interface 250 for security analysts who are dedicated to monitoring the web servers for potential attacks, on behalf of the operators. In some embodiments, the user interface 250 may be a graphical user interface that provides information about potential successful attacks, including information about the attacker, the initial attack attempt, and follow-on activities observed after the attack attempt. In some embodiments, the attack reporting interface 150 may allow the user to review additional details surrounding the attack (e.g. by retrieving additional information from the attacked web server) and/or initiate mitigation actions in response to the attack.

In some embodiments, the user interfaces 250 may also include a configuration interface 252. The configuration interface 252 may be used to configure various aspects of the cyberattack monitoring service 230, such as the detection criteria used by the monitoring service and the mitigation actions that are performed by the service. In some embodiments, the configuration interface 252 may also be used by security analysts to update the attacker database 146 and/or attack patterns 144. For example, newly discovered attack patterns may periodically be added to the attack patterns 144. As another example, data about a suspected attacker may be updated in the attacker database to incorporate results of later investigations about the activities of the attacker.

Figure 3:
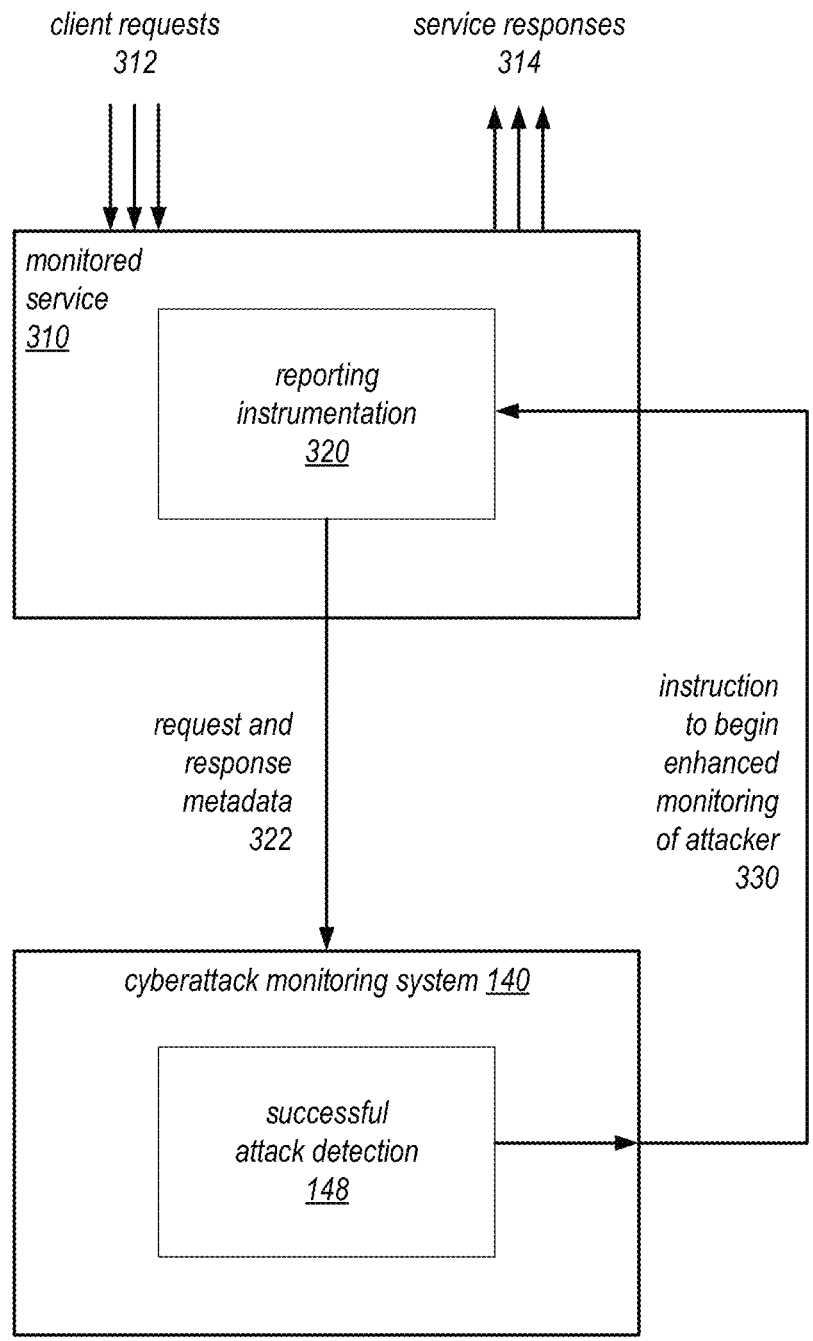
FIG. 3 illustrates components of a cyberattack monitoring system configured to detect successful attacks on a service using reporting instrumentation implemented in the service, according to some embodiments.

FIG. 3 illustrates components of a cyberattack monitoring system configured to detect successful attacks on a service using reporting instrumentation implemented in the service, according to some embodiments.

The monitored service 310 shown in the figure is an embodiment of the service 120 of FIG. 1. As shown, service 310 is configured to receive client requests 312 and provide service responses 314. In this example, the service 310 includes reporting instrumentation 320, which may be implemented using one or more software modules on the server itself. The reporting instrumentation 320 may be configured to work in tandem with the cyberattack monitoring system 140 to collect request and response metadata 322 about the monitored service 310. In some embodiments, the reporting instrumentation 320 may be configured to perform at least some of the functionality of the cyberattack monitoring service 140 discussed in connection with FIG. 1. For example, in some embodiments, detection of initial attacks based on attack pattern matching may be performed by the reporting instrumentation 320. In some embodiments, the reporting instrumentation may begin to report the request and response metadata 322 for a particular client after an attempted attack by the client is observed.

In some embodiments, the cyberattack monitoring system 140 will monitor the request and response metadata 322 from the reporting instrumentation 320 for a successful attack. This detection may be performed using the successful attack detection component 148, as discussed in connection with FIG. 1. In some embodiments, when a successful attack is observed, the cyberattack monitoring system 140 may issue an instruction 330 to the reporting instrumentation 320 to begin performing enhanced monitoring of the attacker. The enhanced monitoring may involve collecting additional metadata about the attacker's interactions with the service. In some embodiments, the additional metadata may include application-specific data that can only be gathered by application-specific components within the service 310. In some embodiments, the enhanced monitoring may cause the reporting instrumentation to report data more frequently. In some embodiments, metadata reported by the enhanced monitoring may enable the cyberattack monitoring system to determine a severity level of the attack. The monitoring system may issue further instructions to the reporting instrumentation as the severity level of the attack increases.

Figure 4A:
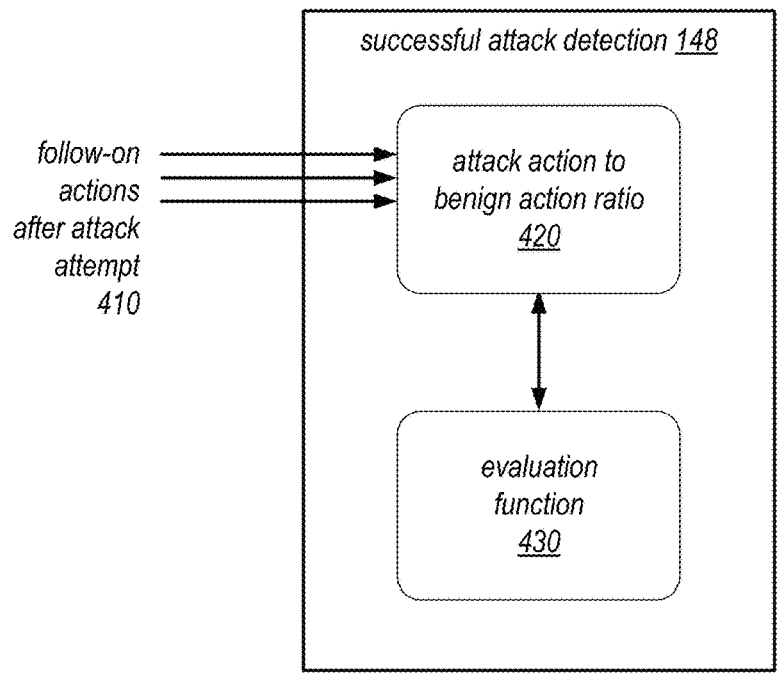
FIGS. 4A and 4B illustrate different embodiments of a successful attack detection component implemented by a cyberattack monitoring system configured to detect successful attacks, according to some embodiments.
Figure 4B:
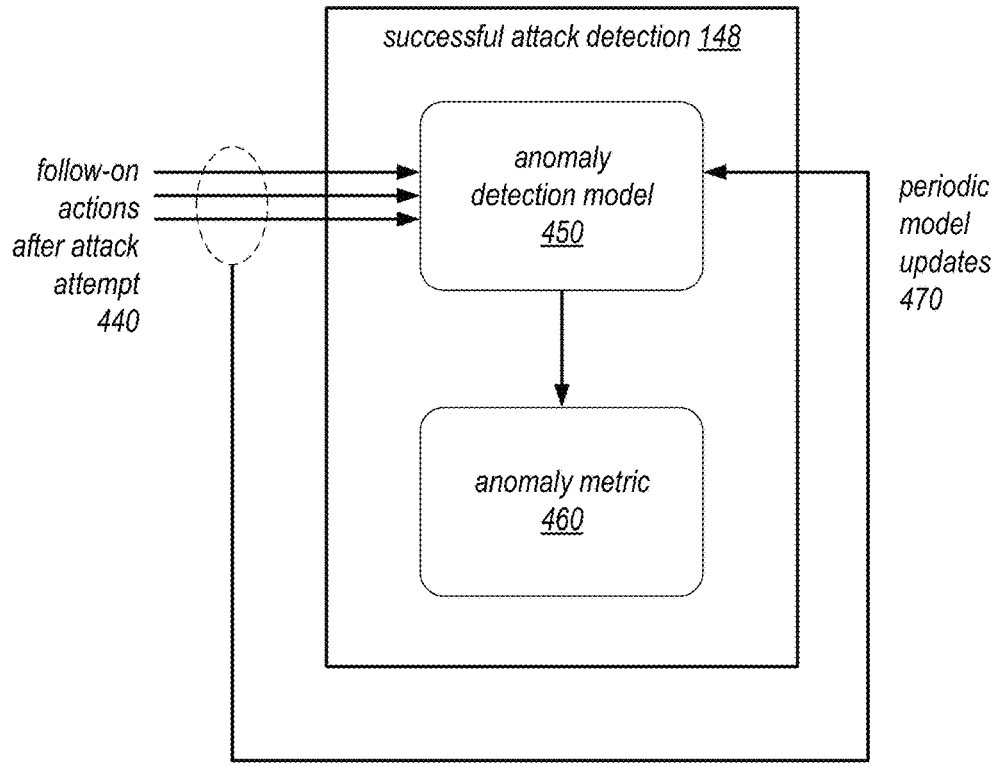

FIGS. 4A and 4B illustrate different embodiments of a successful attack detection component implemented by a cyberattack monitoring system (e.g. attack monitoring system 140) configured to detect successful attacks, according to some embodiments.

FIG. 4A depicts an embodiment of the successful attack detection module 148 that analyzes follow-on actions 410 of an attacker using a statistic such as an attack action to benign action ratio 420. In some embodiments, the successful attack detector 148 may continue to recognize particular actions or action sequences as attack actions after the initial attack attempt, even if these actions do not match any of the attack patterns known to the monitoring system. For example, a single failed login attempt may be considered an attack action, even though it does not rise to the level of an attempted attack, which may require multiple failed logins. In some embodiments, the successful attack detector 148 will track metrics such as the attack action to benign action ratio over time, and evaluate the metrics using an evaluation function 430 to determine if the detection criterion for a successful attack has been met. For example, the evaluation function 430 may compare the ratio 420 to a threshold ratio and report a successful attack if the observed ratio exceeds the threshold.

Depending on the embodiment, many different types of successful attack detection metrics may be used. In some embodiments, the detection metrics may include the amount of follow-on actions performed by the suspected attacker within a specific time window. In some embodiments, the access to protected or restricted area of the service may be used. In some embodiments, the frequency of attack actions over a moving time window may be used. In some embodiments, the amount of data downloaded and/or uploaded by the follow-on actions may be used as a detection metric. In some embodiments, the length of a session maintained by the attacker may be used as a detection metric. In some embodiments, a combination of many detection metrics may be combined into a composite value based on the evaluation function 430. In some embodiments, the evaluation function may be implemented by a machine learning model whose parameters are learned using one or more machine learning techniques.

FIG. 4B depicts another embodiment of the successful attack detector that analyzes follow-on actions 440 of an attacker using an anomaly detection model 450. The anomaly detection model 450 may be a machine learning model trained to distinguish between follow-on actions that look like furtherance of an attack versus "normal" behaviors of clients that are not furthering the attack. For example, the model 450 may be trained to focus on certain characteristics of the follow-on activity such as the amount of data downloaded, the number of different servers accessed, the particular APIs used, the timing of the follow-on actions, etc. Based on these factors, the anomaly detection model may periodically output an anomaly metric 460, which may be used to determine whether the follow-on actions 440 constitute a furtherance of a successful attack. In some embodiments, the anomaly metric 460 may be continuously updated in real time or near real time for all observed attackers.

The anomaly detection model 450 may be trained in a variety of ways. In some embodiments, the model may be trained offline. A trained model may periodically replace the working model 450 when performance (e.g. accuracy) of the former substantially exceeds performance of the latter. In some embodiments, the model may be trained 470 in an online manner using a sampling of the follow-on activity data 440 as they are received by the detector 148. In this manner, the model can be automatically updated 470 over time to keep up with the changing behavior patterns of attackers. In some embodiments, the model 450 may be trained in an unsupervised manner, where the training data is not labeled. As one example, the model 450 may implement a clustering technique that assigns action sequences of suspected attackers to different clusters, where certain clusters are associated with malicious behavior. In some embodiments, the model 450 may be trained using labeled data where actual instances of attacks are labeled as such. In some embodiments, the anomaly detection model 450 may be shared across multiple monitored services, so that the model is used to analyze client interactions with each of the multiple services. In some embodiments, the successful attack detector 148 may employ multiple anomaly detection models 450. Different models may be used depending on the type of initial attack that was observed.

FIG. 5 illustrates a graphical user interface that allows a user to review and take mitigation actions on successful attacks on a service detected by a cyberattack monitoring system, according to some embodiments. The depicted GUI 500 may be implemented as part of the attack reporting interface 150 of FIG. 1.

As shown, the GUI 500 displays a list of potentially successful attacks detected by the cyberattack monitoring system to security analysts. As discussed, by filtering observed attacks based on the attackers' follow-on activities, the monitoring system is able to drastically reduce the number of attacks reported by the GUI, thereby allowing analysts to focus their attention on the more serious attacks.

In some embodiments, the GUI may be implemented as a screening tool that allows users to filter through attacks identified by the monitoring system using different types of filtering criteria.

As shown, the GUI 500 in this example displays several detected successful attacks in a table. The table indicates information about each of the detected attacks, including the attacker ID 510, the attack pattern 512 that matched the initial attack attempt, the time 514 of the initial attack attempt, the time 516 of the follow-on activities of the attacker, and a severity score 518 of the follow-on activities, which may be computed by the successful attack detection component 148. In some embodiments, this severity score may indicate a probability or likelihood that the observed activities represent a genuine attack. In some embodiments, the severity score may indicate a measure of how far the attack has progressed or how much damage the attack has potentially caused. For example, the severity score may be computed based on factors such as the amount of data exfiltrated, the number of databases accessed, the time the attacker has spent on the service, etc.

As shown, section 520 of the GUI provides several controls that allow the user to review detailed information about a selected attack (here the third attack in the table). In this example, the user controls allow the user to view the raw log data associated with the initial attack attempt 522, log entries associated with the follow-on activities 524, details of the attacker in the attacker database 526, and the attacker's activities on other systems 528. In some embodiments, the GUI may provide a unified view for attacks detected by multiple cyberattack monitoring systems monitoring multiple services.

As shown, section 530 of the GUI provides controls that allow a user to initiate attack mitigation measures against the selected attack. As shown in this example, the user controls allow the user to block further actions from the attacker on the service 532, roll back previous attack actions 534, and track further attacker actions 536 (e.g. using more enhanced monitoring techniques). Additionally, button 528 allows the user to leave comments about the selected attack, which may indicate the user's conclusions about the attack and instructions about additional investigative or mitigation steps to be taken. In some embodiments, a security analyst's conclusions about a detected attack may be used to label the associated activity data, so that the activity data can be used as training data to improve the machine learning model(s) used by the attack monitoring system.

Figure 6:
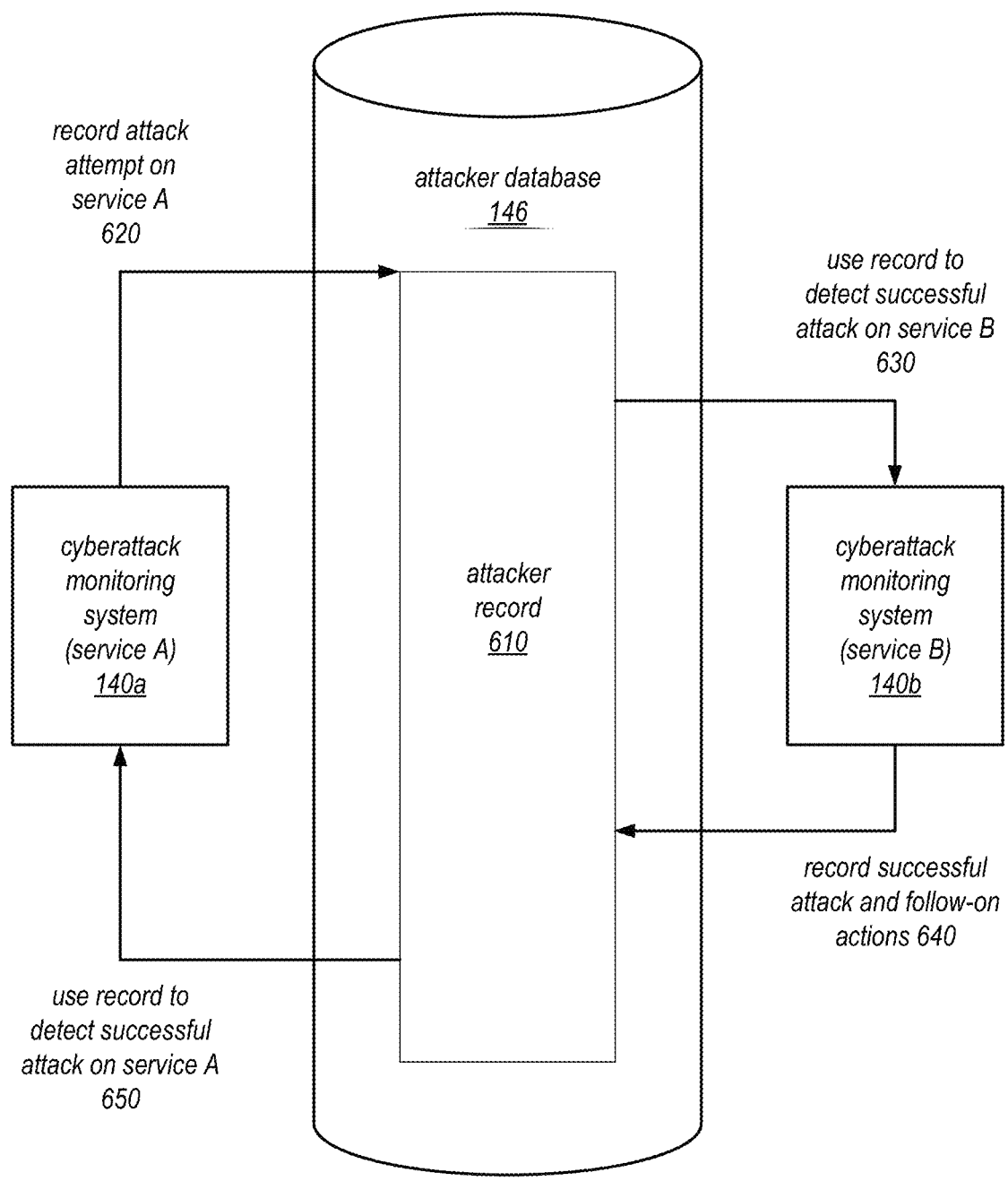
FIG. 6 illustrates an example of two cyberattack monitoring systems sharing information about an attacker through an attacker database, according to some embodiments.

FIG. 6 illustrates an example of two cyberattack monitoring systems sharing information about an attacker through an attacker database, according to some embodiments.

As shown, in some embodiments, the attacker database 146 may be shared by multiple cyberattack monitoring systems (e.g. monitoring systems 140a and 140b monitoring different services A and B). The attacker database may be used by the different monitoring systems 140a and 140b to share information about an attacker, so that the actions of an attacker will be known to all monitoring systems registered to access the attacker database. This information sharing enables the different monitoring systems to react much more quickly to a new attacker. As one example, in a SIM swap attack, an attacker may use a compromised device to gain access to multiple services used by the device's owner. A shared database such as attacker database 146 may be implemented (e.g. by the carrier company) to broadcast information about attacks against any of the device owner's service providers. Using this information, a service provider will be able to learn of the attack more quickly, so that it can take timely steps to prevent furtherance of the attack against its own service.

As shown, in this example, cyberattack monitoring system 140a first detects an attempted attack by an attacker on service A, and records 620 the attempted attack in the attacker database. The first recorded attack attempt by the attacker may start an attacker record 610 for the attacker. Once the attack attempt is recorded, another cyberattack monitoring system 140b can use that information to watch for activities from that attacker on its monitored service B. Due to the presence of the attacker record 610 in the database, seemingly benign activities by that attacker on service B may be recognized 630 as a successful attack on service B. The detection will cause monitoring system 140b to record 640 the successful attack and information about the attacker's follow-on actions to the attacker database as part of the attacker record 610. This additional information will now be available to monitoring system 140a, which can use 650 the information to detect a successful attack on service A. By sharing information about the attack in this manner, the two monitoring systems are able to gain a much better understanding of the attacker and make better decisions about the attacker's activities.

As discussed earlier, in some embodiments, the attacker records 610 in the attacker database may be updated by security analysts, for example, via the configuration interface 252 of FIG. 2. For example, in some embodiments, a suspected attacker may be removed from the attacker database if the detected attacks were determined to be false positives after analyst review. In some cases, attackers may frequently change their source IP address, change the VPN connection ID, or use source obfuscation services such as TOR onion router. In such cases, it does not make sense to track attackers using static identifiers over long periods of time. Accordingly, in some embodiments, recorded attackers may be automatically removed from the database after a cool-off period where no activity from the attacker is observed. In some embodiments, the length of the cool-off period may be configurable or automatically varied based on the type or severity of the observed attack.

Figure 7:
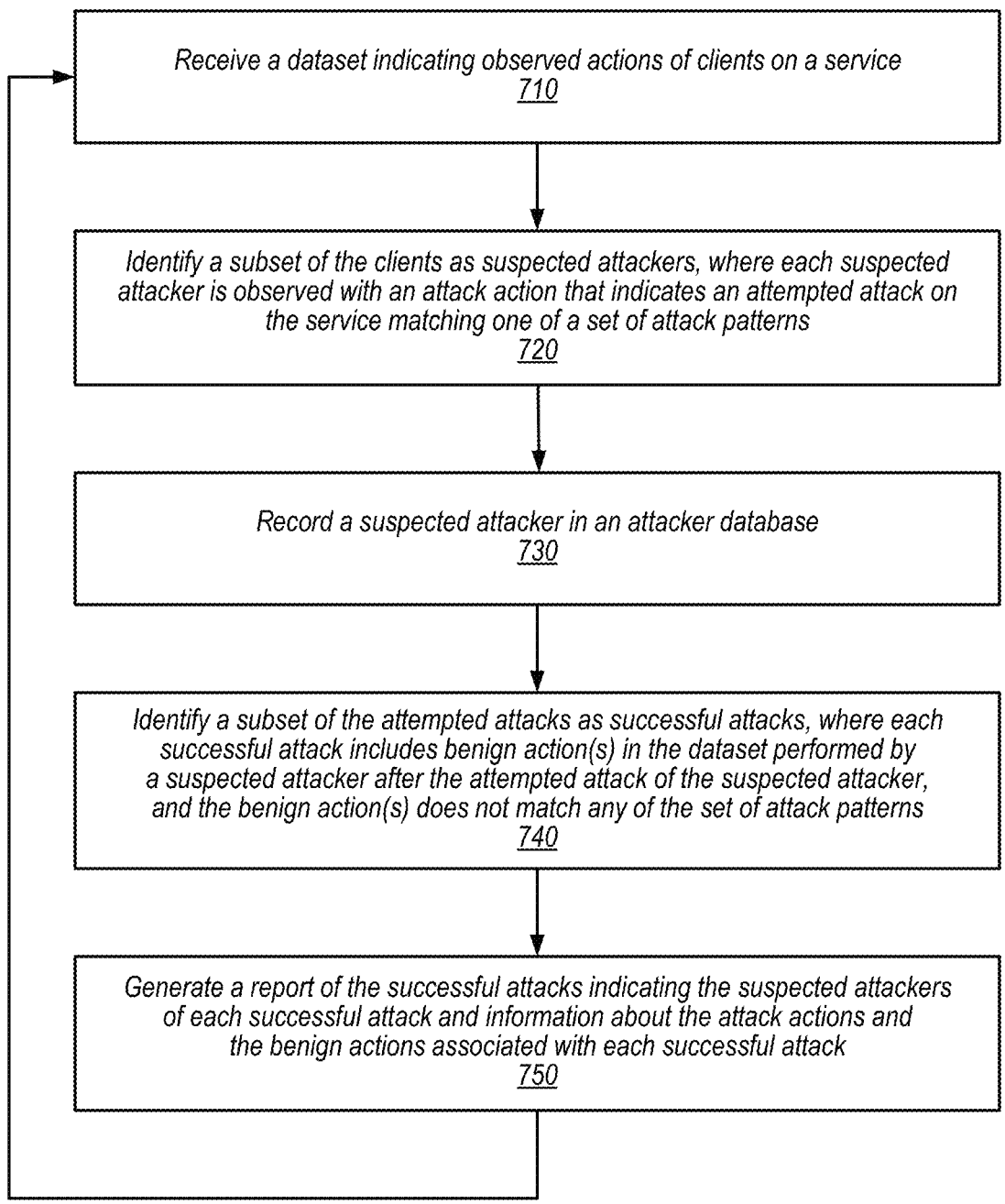
FIG. 7 is a flowchart illustrating a process of generating a report of successful attacks detected using a cyberattack monitoring system, according to some embodiments.

FIG. 7 is a flowchart illustrating a process of generating a report of successful attacks detected using a cyberattack monitoring system, according to some embodiments. The depicted process may be performed by an embodiment of the cyberattack monitoring system 140 of FIG. 1.

The process begins at operation 710, where the monitoring system receives a dataset indicating observed actions of clients on a service. In some embodiments, the server may be a web-based service such as a website or web application implemented using one or more web servers. In some embodiments, the dataset may be a web server log indicating client requests and server responses in the HTTP protocol. In some embodiments, the service may allow remote users to log on to one or more servers and execute commands on the one or more servers. In some embodiments, the dataset may be a log of user activities performed on servers (e.g. commands executed by the users). In some embodiments, the datasets may be uploaded to the monitoring system as periodic log files. In some embodiments, the dataset may be received as a continuous data stream from the monitored service (e.g. reported by instrumentation implemented within the service).

At operation 720, the monitoring system identifies a subset of the clients as suspected attackers. A suspected attacker may be a client observed with one or more attack actions that matches one of a set of attack patterns known, indicating an attempted attack on the service. In some embodiments, the attack patterns may be stored in a data store such as the attack patterns data store 144 of FIG. 1. In some embodiments, the attack patterns may be maintained in volatile memory and used by the attack attempt detection component 142 to scan all client requests for attempted attacks. The attack patterns may be defined to match observations such as a number of unsuccessful logins, a number of accesses to nonexistent data, a request to access unauthorized data, an illegal API call, an API call with invalid call parameters, and the like. In some embodiments, the attack patterns may match specific types of attacks, as shown in FIG. 5. In some embodiments, the attack patterns may be implemented using an evaluation function that evaluates characteristics or statistical metrics of an action sequence of a client. In some embodiments, the attack patterns may be encoded in a machine learning model that is trained to recognize attempted attacks on the service.

At operation 730, a suspected attacker is recorded in an attacker database, such as attacker database 146 of FIG. 1. In some embodiments, a copy of the attacker database may be maintained in volatile memory, where an attacker may be remembered temporarily (e.g. over a week or a client session). In some embodiments, the attacker database may store attacker data persistently on long-term storage. In some embodiments, the attacker database may be shared by multiple monitoring systems that are monitoring different services, so that activities of a single attacker across the multiple services are aggregated in one place and analyzed together. The attacker database may store information such as the identity of the suspected attacker, the time(s) of the attempted attack(s) carried out by the attack, and descriptions of the attempted attack(s) (e.g. the attack pattern that was matched), etc.

At operation 740, the monitoring system identifies a subset of the attempted attacks as successful attacks based on follow-on benign actions of suspected attackers. In some embodiments, an attempted attack is recognized as a successful attack when benign actions from the attacker are observed in the dataset after the initial attempted attack. These benign actions do not necessarily match any of the set of attack patterns used by the monitoring system. As discussed, in most cases, attackers do not return to a website or service if the initial attack attempt fails. Thus, any follow-on actions by the attacker after the attack attempt is an indication that the initial attack was successful. In some embodiments, the following actions may be evaluated by a component such as the successful attack detection component 148 of FIG. 1. For example, some embodiments of the successful attack detector may track statistical metrics of the follow-on actions, such as a ratio of attack actions to benign actions. In some embodiments, the successful attack detector may evaluate the follow-on actions using a machine learning model, such as an anomaly detection model trained to recognize successful attacks based on the anomalousness of the follow-on actions compared to "normal" activities of clients. In some embodiments, the monitoring system may detect successful attacks in a single forward scan of the dataset, without re-evaluating previous actions in the dataset already observed.

At operation 750, the attack monitoring system will generate a report of the successful attacks detected. The report may indicate detailed information about each successful attack, such as the attackers associated with the attack, the attack actions that were matched to the attack patterns, and the follow-on benign actions that confirmed the successful attack. In some embodiments, the report may be recorded in a log or a database. In some embodiments, the report may be issued as an alert that is broadcast to interested parties, such as security analysts or the service's operator. In some embodiments, the report may be presented in a graphical user interface such as GUI 500 of FIG. 5. Such a GUI may provide user controls that allow a user to view further details about the attack and initiate mitigation actions to respond to the attack. As shown, the depicted process may be repeated in a loop. For example, in some embodiments, the datasets (e.g. server logs) may be uploaded periodically (e.g. once a day), and the cyberattack monitoring system may evaluate the datasets on a daily basis to identify potential successful attacks for human review.

Figure 8:
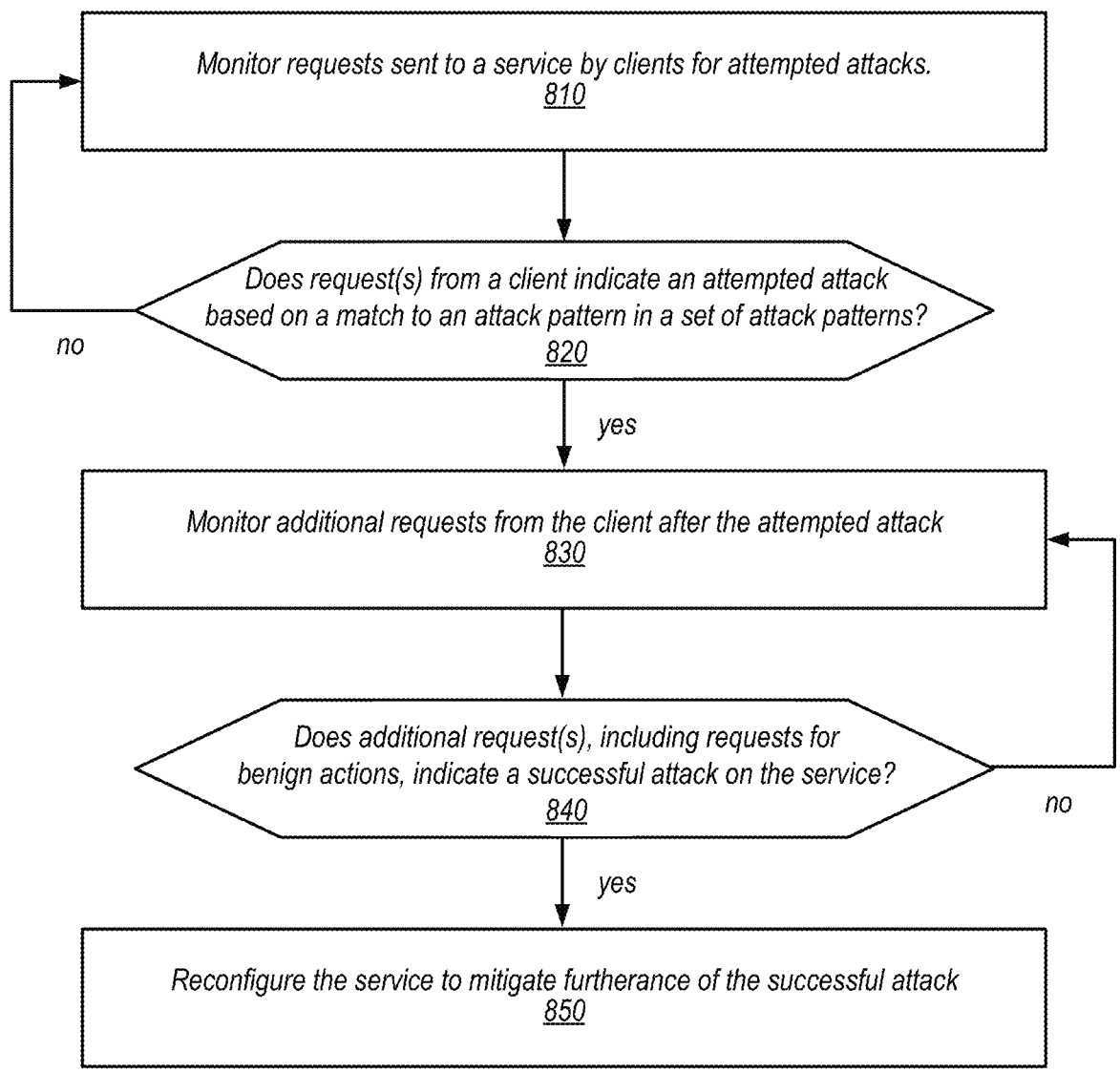
FIG. 8 is a flowchart illustrating a process of an automatic reconfiguration of a service to mitigate furtherance of a successful attack detected by a cyberattack monitoring system, according to some embodiments.

FIG. 8 is a flowchart illustrating a process of an automatic reconfiguration of a service to mitigate furtherance of a successful attack detected by a cyberattack monitoring system, according to some embodiments. The depicted process may be performed by an embodiment of the cyberattack monitoring system 140 of FIG. 1. In some embodiments, the process may be performed by a cyberattack mitigation system implemented within the service itself.

At operation 810, requests sent to a service by a plurality of clients are monitored for attempted attacks. Based on the monitoring and at operation 820, a determination is made whether one or more requests from a particular client indicates an attempted attack against the service. Operations 810 and 820 may be performed by an embodiment of the attack attempt detector 142 of FIG. 1. As discussed, in some embodiments, attack attempts against the service may be detected based on a set of attack patterns known to the attack attempt detector. In some embodiments, one or more machine learning models may be used to recognize attempted attacks. As shown, the monitoring 810 will continue in a loop until an attack attempt by a particular client is observed. Once this occurs, the process proceeds to a next stage of monitoring for the particular client.

At operation 830, additional requests from the particular client after the attempted attack are monitored. Based on this monitoring and at operation 840, a determination is made whether the additional requests, which may be requests for benign actions, indicate a successful attack on the service. Operations 830 and 840 may be performed by an embodiment of the successful attack detection component 148 of FIG. 1. As discussed, in some embodiments, the monitoring system may use more sophisticated monitoring techniques to watch the activities of suspected attackers previously observed with an attack attempt. These more sophisticated monitoring techniques may take into account benign actions of the suspected attacker (e.g. those actions that do not match any of the initial attack patterns) to determine if they indicate a furtherance of the attack. In some embodiments, such later actions by the suspected attacker may be analyzed by one or more machine learning models. In some embodiments, these more sophisticated monitoring techniques are only used to monitor suspected attackers, because using them to monitor all client requests exceeds the resource capacities of the monitoring system. As shown, the monitoring 830 will continue in a loop for the suspected attacker until a successful attack by the attacker is detected.

Once a successful attack by the attacker is detected, the process proceeds to operation 850, where the service is reconfigured to mitigate furtherance of the successful attack. In some embodiments, the reconfigurations may be performed by an embodiment of the attack mitigation component 152 of FIG. 1. The mitigation measures may vary depending on the embodiment and the degree of severity of the attack. In some embodiments, the service may be reconfigured to deny further requests from the attacker. In some embodiments, the service may be configured to reduce the rate at which requests from the attack are accepted by the service. In some embodiments, results of earlier requests from the attacker may be rolled back. In some embodiments, further requests from the attacker will be routed to a particular server that is specially designated to handle suspected attackers (e.g. a server that is in an isolated data environment). Advantageously, the monitoring system is capable of detecting successful attacks in real time or near real time as the requests are received, so that the mitigation responses can be initiated in time to respond to the attack.

Figure 9:
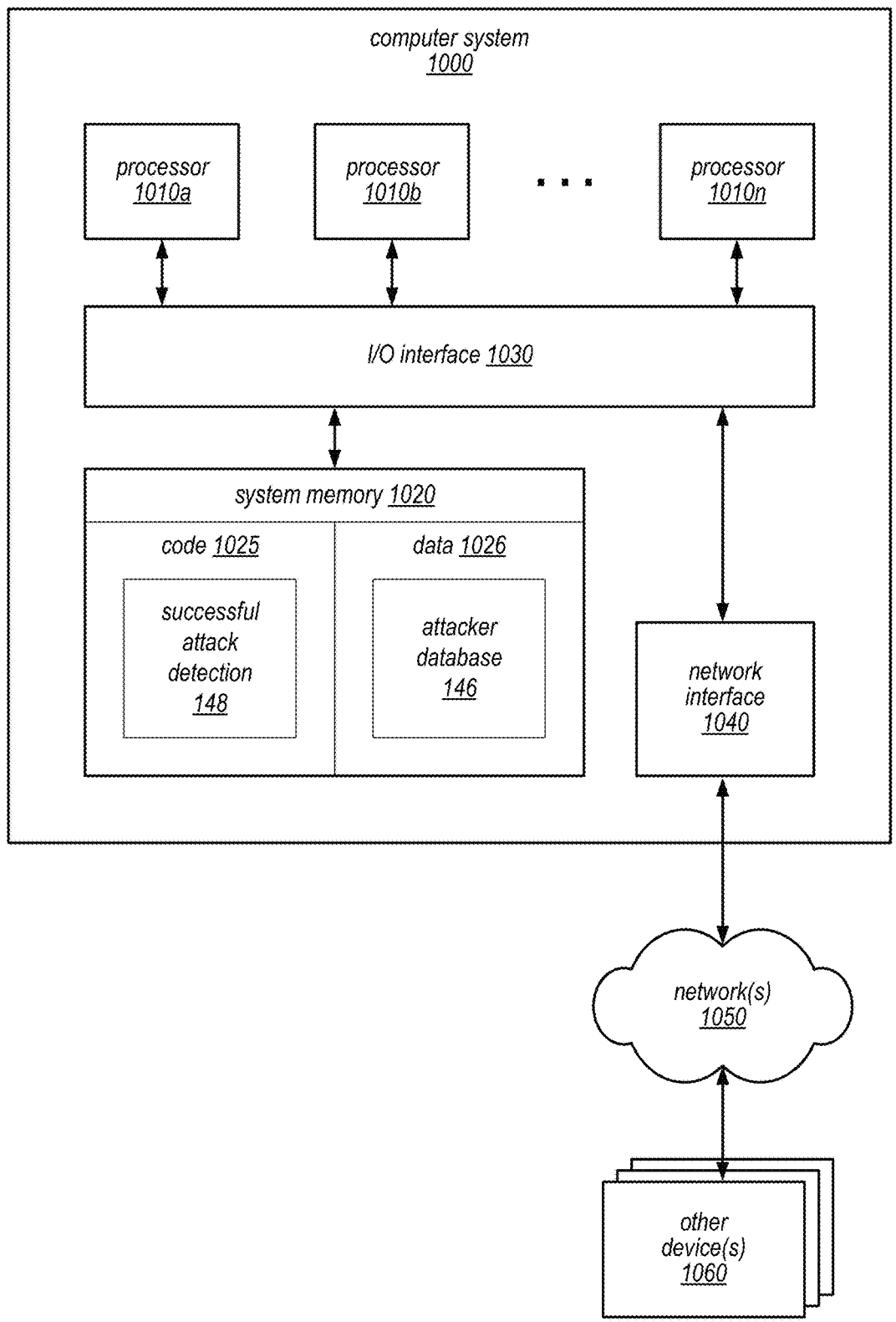
FIG. 9 is a block diagram illustrating an example computer system that can be used to implement one or more portions of a cyberattack monitoring system configured to detect successful attacks based on subsequent benign actions of an attacker following an initial attack, according to some embodiments.

FIG. 9 is a block diagram illustrating an example computer system that can be used to implement one or more portions of a cyberattack monitoring system configured to detect successful attacks based on subsequent benign actions of an attacker following an initial attack, according to some embodiments. For example, the computer system 1000 may be used to implement one or more components of the cyberattack monitoring system 140 of FIG. 1.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device. As shown, computer system 1000 includes one or more processors 1010, which may be the multithreading processor 140 of FIG. 1. These processors 1010 may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. In various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may store instructions that implement the successful attack detection component 148, as discussed. The system memory 1020 may also be used to store data 1026 needed or produced by the executable instructions. For example, the in-memory data 1026 may be used to store attacker data in the attacker database 146, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system comprising:
one or more computer devices that implement a cyberattack reporting system, configured to:
receive a dataset indicating observed actions of a plurality of clients on a service;
identify a subset of the clients as suspected attackers, wherein each suspected attacker is observed with one or more attack actions in the dataset that indicates an attempted attack on the service matching at least one of a set of attack patterns;
identify a subset of the attempted attacks as successful attacks, wherein each successful attack includes one or more benign actions in the dataset performed by a suspected attacker after the attempted attack of the suspected attacker, and the one or more benign actions does not match any of the set of attack patterns; and
generate a report of the successful attacks, wherein the report indicates the suspected attackers of each successful attack and information about the attack actions and the benign actions associated with each successful attack;
wherein the cyberattack reporting system is configured to determine that two web requests are issued by a same client based on one or more of:
a source IP address of the two web requests;
an identity tracking object associated with the two web requests;
a session identifier associated with the two web requests; and
one or more HTTP header attributes of the two web requests.

2. The system of claim 1, wherein:
the service is implemented using one or more web servers; and
the dataset is a web server log that indicates web requests directed to the one or more web servers.

3. The system of claim 1, wherein the cyberattack reporting system is configured to receive and analyze web server logs of a plurality of web servers operated by a plurality of operators.

4. The system of claim 1, wherein the set of attack patterns matches one or more of:
a number of unsuccessful logins;
a number of accesses to nonexistent data;
a request to access unauthorized data;
an illegal API call; and
an API call with invalid call parameters.

5. The system of claim 1, wherein to identify a particular client as a suspected attacker, the cyberattack reporting system is configured to:
determine an action sequence of a particular client in the dataset;
apply an evaluation function to the action sequence to obtain an attack likelihood metric; and determine that the attack likelihood metric exceeds a detection threshold.

6. The system of claim 1, wherein to identify a particular client as a suspected attacker, the cyberattack reporting system is configured to:
determine an action sequence of the particular client in the dataset;
analyze the action sequence using a machine learning model trained to recognize different attack patterns in different action sequences; and
determine that the action sequence corresponds to an attack pattern based on output of the machine learning model.

7. The system of claim 1, wherein to identify a particular attempted attack as a successful attack, the cyberattack reporting system is configured to:
determine an action sequence of a particular attacker that performed the particular attempted attack, wherein the action sequence is performed after the particular attack and includes one or more benign actions;
analyze the action sequence using a machine learning model, wherein the machine learning model is trained to produce an anomaly metric of the action sequence; and
determine that the anomaly metric exceeds a threshold.

8. The system of claim 1, wherein to identify a particular attempted attack as a successful attack, the cyberattack reporting system is configured to:
determine an action sequence of a particular attacker that performed the particular attempted attack, wherein the action sequence is performed after the particular attack and includes one or more benign actions;
determine a ratio of a number of attack actions in the action sequence and a number of benign actions in the action sequence; and
determine that the ratio exceeds a threshold.

9. The system of claim 1, wherein the cyberattack reporting system is configured to generate the report of the successful attacks on a graphical user interface (GUI) of the cyberattack reporting system.

10. The system of claim 9, wherein the cyberattack reporting system is configured to:
responsive to a user input received via the GUI, initiate one or more remedial actions to mitigate a particular attack displayed in the GUI, including one or more of:
block a suspected attacker associated with the particular attack from performing further actions on the service;
roll back one or more results of one or more earlier actions of the suspected attacker on the service; and
perform enhanced monitoring of further actions of the suspected attacker on the service.

11. The system of claim 1, wherein the cyberattack reporting system is configured to:
record a suspected attacker in an attacker database, wherein the attacker database is accessed by one or more other services configured to record, monitor, or mitigate actions of suspected attackers in the attacker database.

12. The system of claim 11, wherein the cyberattack reporting system is configured to:
update a record of the suspected attacker in the attacker database based on additional observed actions of the suspected attacker on the service.

13. A method comprising:
performing, by a cyberattack reporting system implemented by one or more computer devices:
receiving a dataset indicating observed actions of a plurality of clients on a service;
identifying a subset of the clients as suspected attackers, wherein each suspected attacker is observed with one or more attack actions in the dataset that indicates an attempted attack on the service matching at least one of a set of attack patterns;
identifying a subset of the attempted attacks as successful attacks, wherein each successful attack includes one or more benign actions in the dataset performed by a suspected attacker after the attempted attack of the suspected attacker, and the one or more benign actions does not match any of the set of attack patterns; and
generating a report of the successful attacks, wherein the report indicates the suspected attackers of each successful attack and information about the attack actions and the benign actions associated with each successful attack;
wherein the cyberattack reporting system is configured to determine that two web requests are issued by a same client based on one or more of:
a source IP address of the two web requests;
an identity tracking object associated with the two web requests;
a session identifier associated with the two web requests; and
one or more HTTP header attributes of the two web requests.

14. The method of claim 13, wherein the dataset is a web server log that indicates web requests directed to one or more web servers.

15. The method of claim 13, wherein the dataset is a log of user activities of different users performed on one or more servers.

16. The method of claim 13, wherein identifying a particular client as a suspected attacker comprises:
determining an action sequence of a particular client in the dataset;
applying an evaluation function to the action sequence to obtain an attack likelihood metric; and
determining that the attack likelihood metric exceeds a detection threshold.

17. The method of claim 13, wherein identifying a particular attempted attack as a successful attack comprises:
determining an action sequence of a particular attacker that performed the particular attempted attack, wherein the action sequence is performed after the particular attack and includes one or more benign actions;
analyzing the action sequence using a machine learning model, wherein the machine learning model is trained to produce an anomaly metric of the action sequence; and
determining that the anomaly metric exceeds a threshold.

18. The method of claim 13, further comprising performing, by the cyberattack reporting system:
recording a suspected attacker in an attacker database, wherein the attacker database is accessed by one or more other services configured to record, monitor, or mitigate actions of suspected attackers in the attacker database; and
updating a record of the suspected attacker in the attacker database based on additional observed actions of the suspected attacker on the service.

19. One or more non-transitory computer-accessible storage media storing program instructions that when executed on or across one or more processors implement a cyberattack reporting system and cause the cyberattack reporting system to:

receive a dataset indicating observed actions of a plurality of clients on a service;

identify a subset of the clients as suspected attackers, wherein each suspected attacker is observed with one or more attack actions in the dataset that indicates an attempted attack on the service matching at least one of a set of attack patterns;

identify a subset of the attempted attacks as successful attacks, wherein each successful attack includes one or more benign actions in the dataset performed by a suspected attacker after the attempted attack of the suspected attacker, and the one or more benign actions does not match any of the set of attack patterns; and generate a report of the successful attacks, wherein the report indicates the suspected attackers of each successful attack and information about the attack actions and the benign actions associated with each successful attack;

wherein the cyberattack reporting system is configured to determine that two web requests are issued by a same client based on one or more of:

a source IP address of the two web requests;

an identity tracking object associated with the two web requests;

a session identifier associated with the two web requests; and one or more HTTP header attributes of the two web requests.

\* \* \* \* \*